(12) United States Patent
Jacob

(10) Patent No.: US 9,483,480 B2
(45) Date of Patent: Nov. 1, 2016

(54) SYSTEM, METHOD, AND COMPUTER PROGRAM PRODUCT FOR USING EYE MOVEMENT TRACKING FOR RETRIEVAL OF OBSERVED INFORMATION AND OF RELATED SPECIFIC CONTEXT

(75) Inventor: Michal Jacob, Haifa (IL)

(73) Assignee: Intel Corporation, Santa Clara, CA (US)

(*) Notice: Subject to any disclaimer, the term of this patent is extended or adjusted under 35 U.S.C. 154(b) by 415 days.

(21) Appl. No.: 13/983,930

(22) PCT Filed: Apr. 23, 2012

(86) PCT No.: PCT/US2012/034700
§ 371 (c)(1),
(2), (4) Date: Aug. 6, 2013

(87) PCT Pub. No.: WO2013/162508
PCT Pub. Date: Oct. 31, 2013

(65) Prior Publication Data
US 2014/0006463 A1    Jan. 2, 2014

(51) Int. Cl.
| | | |
|---|---|---|
| G06F 7/00 | (2006.01) |
| G06F 17/30 | (2006.01) |
| G06K 9/00 | (2006.01) |
| G06K 9/32 | (2006.01) |

(52) U.S. Cl.
CPC ... G06F 17/30091 (2013.01); G06F 17/30029 (2013.01); G06F 17/30038 (2013.01); G06K 9/00604 (2013.01); G06K 9/3233 (2013.01)

(58) Field of Classification Search
CPC ............... G06F 17/30029; G06F 17/30038
See application file for complete search history.

(56) References Cited

U.S. PATENT DOCUMENTS 4,974,010 A * 11/1990 Cleveland et al. ............. 396/51
6,351,273 B1 * 2/2002 Lemelson et al. ............ 715/786
(Continued)

FOREIGN PATENT DOCUMENTS

| | | |
|---|---|---|
| WO | 2006/110472 A2 | 10/2006 |
| WO | 2013/162508 A1 | 10/2013 |

OTHER PUBLICATIONS

International Search Report and Written Opinion received for PCT Patent Application No. PCT/US2012/034700, mailed Oct. 29, 2012, 10 pages.

(Continued)

Primary Examiner — Loan T Nguyen
(74) Attorney, Agent, or Firm — Garrett IP, LLC

(57) ABSTRACT

Methods and systems to identify a portion of content, for each of multiple instances of content presented at a display, based on eye contact of a user, populate records of the portions of content with contextual information, and search a data field(s) of the record to identify content of interest to the user amongst the portions of content. The search may be based on a, without limitation, a user-specified application program, file type, URL, time, display position, content presented at the display prior to, concurrently with, and/or subsequent to presentation of content of interest to the user, and/or an action performed by the user prior to and/or subsequent to a time at which the content of interest to the user had been presented at the display.

30 Claims, 10 Drawing Sheets

(56) References Cited

U.S. PATENT DOCUMENTS

| | | | |
|---|---|---|---|
| 6,873,314 B1 | 3/2005 | Campbell | |
| 6,886,137 B2* | 4/2005 | Peck et al. | 715/785 |
| 7,365,738 B2* | 4/2008 | Molander et al. | 345/157 |
| 2002/0103625 A1* | 8/2002 | Card | G06F 3/013 702/187 |
| 2005/0271304 A1* | 12/2005 | Retterath et al. | 382/305 |
| 2009/0080734 A1* | 3/2009 | Moriya et al. | 382/128 |
| 2010/0191727 A1 | 7/2010 | Malik | |
| 2012/0140990 A1* | 6/2012 | Retterath | G06K 9/3233 382/108 |
| 2013/0187835 A1* | 7/2013 | Vaught et al. | 345/8 |

OTHER PUBLICATIONS

Jacob, et al., "Comparing eye movements to detected vs. undetected target stimuli in an Identity Search Task", Journal of Vision, 9(5):20, 1-16, 2009, 16 pages.

Jacob, et al., "Graded recognition as a function of the number of target fixations", Vision Research, 50, 107-117, 2010, 19 pages.

Jacob, et al., "Gathering and retaining visual information over recurring fixations: A model", Cognitive Computation, 3, 105-123, 2011, 2 pages.

International Preliminary Report on Patentability and Written Opinion received for PCT Patent Application No. PCT/US2012/034700, mailed on Nov. 6, 2014, 7 pages.

* cited by examiner

SYSTEM, METHOD, AND COMPUTER PROGRAM PRODUCT FOR USING EYE MOVEMENT TRACKING FOR RETRIEVAL OF OBSERVED INFORMATION AND OF RELATED SPECIFIC CONTEXT

BACKGROUND

Computer users often need to revisit something that they have recently seen on their screen. One example of technology that addresses this need is the search history. Search engines are often designed to save previously entered search terms, so that a user may revisit data that was seen earlier. In another example, web browsers may maintain a record of previously visited sites. If one wants to find previously visited websites, one can search according to a name, URL or timeline, and retrieve the desired pages. A similar arrangement could be used to access recently used files or applications, using an operating system's "search programs and files" utility.

However, current utilities are generally limited to retrieval based on the use of a program or file. A user may be given a list of previously opened files or previously visited websites, for example. This supplies only imprecise and non-focused data, is not particularly natural, and does not allow direct retrieval of information that had been the earlier focus of the user. Moreover, the search criteria, since not relying on the user's behavior, may be restricted to superficial data (e.g., keywords, time, file size, etc.). This does not make use of the natural flow of a human user's interaction with the computer. It does not take into consideration the context of the data being sought, and does not always allow the user to accurately backtrack according to his or her own intentional and specific interests. The current search methods, for instance, do not necessarily help the user in retrieving data when recalling vaguely what he or she has recently seen or read.

BRIEF DESCRIPTION OF THE DRAWINGS/FIGURES

Figure 1:
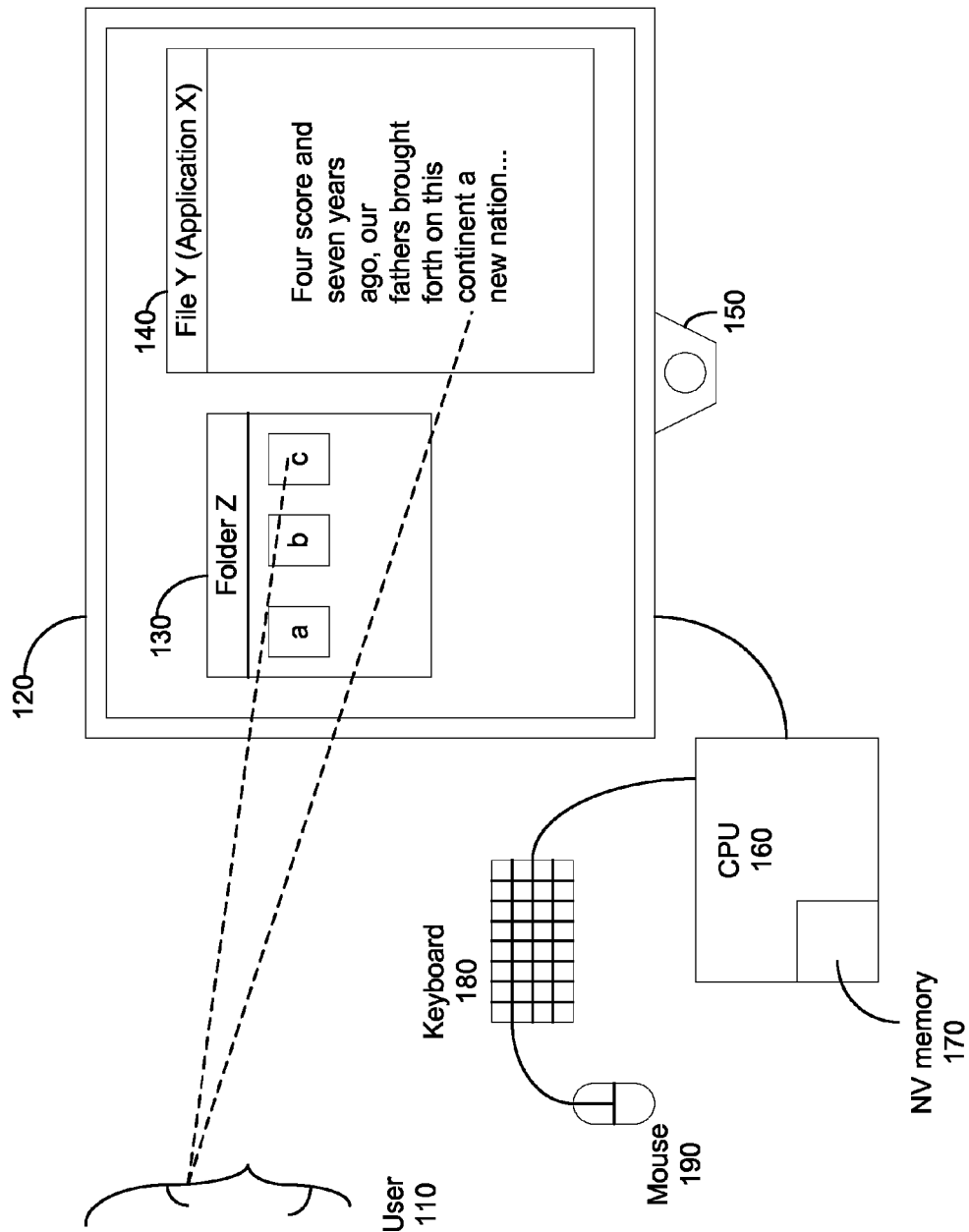
FIG. 1 illustrates the use of the system described herein, according to an embodiment.

In the drawings, the leftmost digit(s) of a reference number identifies the drawing in which the reference number first appears.

DETAILED DESCRIPTION

An embodiment is now described with reference to the figures, where like reference numbers indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods, systems, and computer program products that solve the technical problem of how to capture or recall content that had been previously viewed by a user on a display of an information appliance, without necessarily requiring the user to take an explicit action to do so.

The methods, systems, and computer program products described below relate to recording text or image data observed by a user in a region of a computer display. This area may be referred to herein as a region of interest (ROI). The content observed by the user in the ROI may be recorded, along with context information pertaining to this content. This context information may include a processing context, which may include, for example, a particular file that was viewed, the application in which the file was opened, and/or a webpage that was viewed. In embodiments, additional information may be recorded, such as the time at which the viewing took place, the screen coordinates of the ROI viewed, content adjacent to the ROI, and/or content that was viewed prior to or after the viewing of the ROI.

All the recorded information may then be used subsequently to recall content that had been previously observed at the ROI. The user may enter search criteria such as information identifying the location of the ROI and/or the time at which the ROI had been viewed, for example. In alternative embodiments, additional or different criteria may be entered by the user. The content that had been observed in the ROI may then be presented to the user. In an embodiment, this content may be presented within the same processing context in which it had been previously observed, e.g., using the same application. This allows the user to get back to information that he had previously seen on screen, by referring to a particular area on the display, the time at which it had been observed, or other criteria. In embodiments, the recording of observed ROIs and related data may be performed continually; alternatively, the recording of particular ROIs and related data may be performed only when a user so chooses.

The systems and methods described herein may take advantage of the physiology of human observation, which is composed of fixations (observations of certain points in a visual field) and saccades (the relocations of points of fixation). The analysis and quantification of fixations, especially when clustered, may allow for the inference of the focused regions, i.e., ROIs. Therefore the eye tracking may allow for the utilization of the observer's natural behavior, for storing (and, later on, retrieving) the regions of interest and the relevant contextual information.

FIG. 1 illustrates a user interacting with a computer system that implements the system described herein, according to an embodiment. In alternative embodiments, other computing platforms may be used, where a central processing unit, keyboard, and/or a mouse may not be separate and distinct components. In FIG. 1, a user 110 may be viewing a display 120. On the display 120 may be a graphical user interface, as may be presented by any known operating system. There are two windows in the example of FIG. 1, one representing an application X in which a file Y 140 has been opened. The other window may represent an open folder Z 130. In this illustration, the user 110 may look at the rightmost icon in folder Z, shown as icon c, then may shift his view to the opened file Y 140, looking at the word "continent." The location of the eyes of user 110 and the direction in which the eyes are focused may be determined using a camera apparatus, shown as apparatus 150, using known technology. Such technology may comprise, for example, an eye tracking system that includes infrared light emitting diodes (LEDs) and a camera at the bottom of the display, below the eye level of the user.

As would be known to a person or ordinary skill in the art, the location and direction of the user's eyes may be used in combination with the location and orientation of the display 120, to determine the region of the display 120 at which the user 110 is looking. As noted above, this region may be termed the region of interest, or ROI. Over time, the user 110 may redirect his vision to other regions of the display. Some of these may be subsequent ROIs, while others may represent regions that are not of genuine interest, but are instead arbitrary or unintentional fixations. Moreover, the user 110 may interact with the operating system and/or the applications on display 120, so that over time the images and text on display 120 may change.

In an embodiment, once a ROI of user 110 is determined, the content at this location may be saved. This allows user 110 to later retrieve this content if desired. The content in the ROI (whether text or an image) may be recorded in a record or other data structure, to allow subsequent search by the user. When the content of the ROI is saved, several related pieces of information may also be saved. These related pieces of information may include the time at which the ROI was observed, the amount of time spent visually dwelling on the ROI, and the screen coordinates of the ROI. Such information may be used subsequently as search criteria. Search criteria may be entered by user 110 through input devices such as keyboard 180 and/or mouse 190.

Information related to the ROI may also include context information for the content. The context information of the ROI may also be recorded. The context information may include the processing context of the content. The processing context may include the name of a file seen in the ROI, the location in the file viewed in the ROI, the application with which the file had been opened, a location in the application (e.g., a selected option in the application), and/or the name of a website viewed, for example.

The information related to the ROI may also include other forms of context. These may include visual temporal context information, i.e., information relating to content viewed by the user just prior to observing the ROI, or just after. In the example of FIG. 1, if user 110 viewed icon c just prior to viewing file Y, and the word "continent" represents the content in the ROI, then the image of icon c represents visual temporal context of the ROI, in that icon c was viewed by user 110 just prior to observing the ROI. If, after looking at the word "continent", the user 110 then directed his attention to the words "Four score", the latter phrase also represents visual temporal context for the ROI.

Another form of context of the ROI may be spatial context, i.e., information related to content neighboring the ROI on the display. In the example of FIG. 1, if the word "continent" represents the ROI, the phrase "new nation" may represent an instance of spatial context of the ROI, in that "new nation" was adjacent to the ROI. Another example of spatial context for this ROI would be the open folder Z to the left of the window of application X.

Another form of context of the ROI may be the user action context, i.e., information relating to the actions of user 110 just before or just after observing the ROI. Examples may include the opening or closing of an application, the saving of a document, or the resizing of a window.

The content of the ROI and its related data that has been saved may be used for subsequent retrieval purposes. For a given ROI observed at a particular time, the content of the ROI and the other related data may be saved as fields or subfields in a record or other data structure. In an embodiment, such records may be saved in a repository in non-volatile (NV) memory 170 in central processing unit (CPU) 160. NV memory 170 may be a hard drive, flash memory, or other device. In another embodiment, NV memory 170 may be external to CPU 160. In an embodiment, records may be saved remotely at another location accessible via a network connection (not shown).

The saved records may allow a user to search over past ROIs to find previously viewed content, where the search may be conducted on the basis of one or more criteria corresponding to the saved information. For example, the user 110 may have closed application X, but later decide that he needs to see a previously viewed file, remembering only that he saw the word "continent" in the file. By having saved the content of the previously observed ROI (here, the word "continent"), user 110 may search for this word over saved ROIs, leading to the file Y. As will be described in greater detail below, the file Y may then be presented to user 110 in an appropriate processing context, e.g., file Y may be presented to user 110 in the context of application X.

Other search criteria may be used. In another example, the user 110 may search for the content that he had seen in the lower right quadrant of the display 120, where he had seen the word "continent". Here, the search may be performed for records whose screen coordinates correspond to the lower right quadrant and whose content corresponds to "continent". The matching record may then be returned, and the file Y opened in the context of application X. Note that the application X and file Y may be chosen because they were identified in the processing context information in the matching record.

The time at which an ROI was observed may also be used as search criteria. User 110 may recall having seen a file of interest at around noon yesterday. Records corresponding to ROIs observed around that time may then be identified, using the time of viewing that may be stored in each record. In this and any other search that yields multiple possibilities, the possible matches may be presented to the user as a list of records using any textual and/or graphic format known to or conceivable by persons of ordinary skill in the art. Given such a list, the user 110 may then select a record and open its content as desired.

Moreover, a search may be performed using a single piece of such information, or using several in combination. For example, the user 110 may wish to see content that had been observed in the lower right quadrant and containing the word "continent". A search may then be performed using both of these criteria.

Note that the examples above are not meant to represent a comprehensive list of possibilities; as would be understood by a person of ordinary skill in the art, other search scenarios may be used, using any of the information saved with respect to an ROI.

While FIG. 1 illustrates one computing platform in which embodiments may be implemented, it should be understood that other embodiments may be implemented in alternative types of platforms. These other platforms may not have a separate CPU, keyboard, and mouse, for example. Such other platforms may include more portable computing devices, such as laptop and notebook computers, tablet computing devices, cell phones, etc. Operation of embodiments in such platforms may be comparable to the operations described above, such that the locations on a display on which a user's eyes dwell may be captured and recorded, along with related context information.

Figure 2:
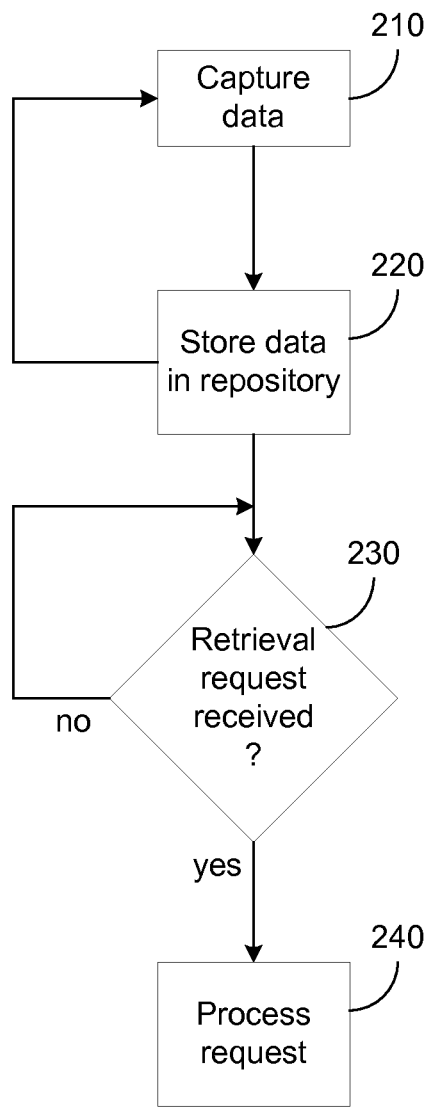
FIG. 2 is a flowchart illustrating the processing of the system described herein, according to an embodiment.

As noted above, the system described herein may record ROIs continually. In such an embodiment, the regions viewed by the user are monitored constantly, where a record may be created and populated for any ROI that the user views for longer than a predetermined interval. The processing for such an embodiment is illustrated in FIG. 2. The operation of the illustrated process presumes that eye tracking functionality has been activated. In an embodiment, this functionality may be turned on by the user. At 210, data may be captured. As discussed above, this captured data may include one or more of the content or image observed in the ROI, the time at which the ROI was observed, the amount of time spent dwelling on the ROI, and the screen coordinates of the ROI. Such data may also include one or more of the processing context, spatial, visual temporal context, and user action context.

At 220, this data may be stored in a repository. In an embodiment, a record for an ROI may be created, where the record includes fields for each of the items above. The record may then be saved in the repository. Because ROIs are recorded continually, the process may return to 210, where the above data items associated with the next ROI may be captured as the user views another region.

At 230, a retrieval request may be received from the user, seeking content that was previously observed. As noted above, this request may take many forms, depending on the type of data captured. Any of the captured data may be used as search criteria if such criteria are specified in the request. The user may ask for content that was observed at a particular time, for example, or content that appeared at a particular location on the display, or that was seen just before sending an email, or that appeared adjacent to some other reference point. These examples are not meant to be an exhaustive list of possibilities; other retrieval requests are possible, as would be understood by a person of ordinary skill in the art.

At 240, the request is processed in a manner to be described in greater detail below. If a record matching the request is found, the corresponding content may be presented to the user. If several records match, the matching records may be presented to the user, either in a complete or abbreviated form; the user may then select from the possible matches. In an embodiment where the full record(s) are presented, the content from the ROI may be highlighted. If no matches are found, the user may be so informed; alternatively, approximately matching records may be presented.

Note that in an embodiment (not shown), the capture and storage of data may continue while a retrieval request is being processed. In such an operation, data capture and storage may operate in parallel with processing of a retrieval request.

Figure 3:
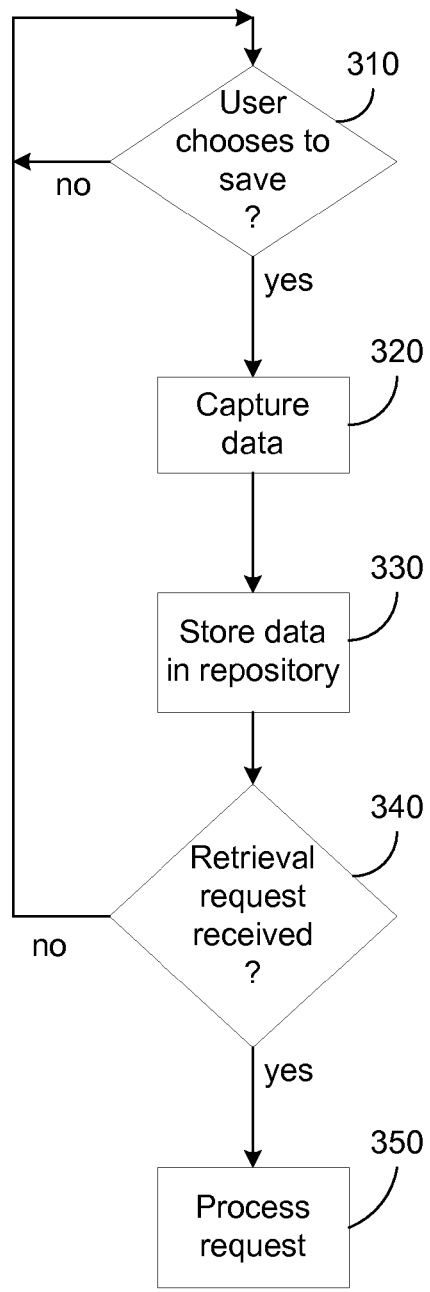
FIG. 3 is a flowchart illustrating the processing of the system described herein, according to an alternative embodiment.

An alternative embodiment is illustrated in FIG. 3. Here, data may be captured only when the user explicitly chooses. At 310, a determination may be made as to whether the user has chosen to capture an ROI and any related data. As an example, the user may view an ROI and, if he wants to capture the ROI's content and related data for possible subsequent access, may click on a mouse button or hit a function key to perform the capture, or perform some other deliberate predefined action. The content in the ROI being observed at that moment may then be captured at 320, along with any related data.

At 330, this data may be stored in a repository. In an embodiment, a record for an ROI may be created, where the record includes fields for related data. The record may then be saved in the repository.

At 340, a retrieval request may be received from the user, seeking content that was previously observed. As noted above, such a request may take many forms, depending on the type of data captured. Any of the captured data may be used as search criteria if such criteria are specified in the request. At 350, the request is processed in a manner to be described in greater detail below. If a record matching the request is found, the corresponding content may be presented to the user. If several records match, the matching records may be presented to the user, either in a complete or abbreviated form; the user may then select from the possible matches. If no matches are found, the user may be so informed; alternatively, approximately matching records may be presented.

Here, as in the case of FIG. 2, the capture and storage of data may continue while a retrieval request is being processed. In such an embodiment, data capture and storage may operate in parallel with processing of a retrieval request.

Figure 4:
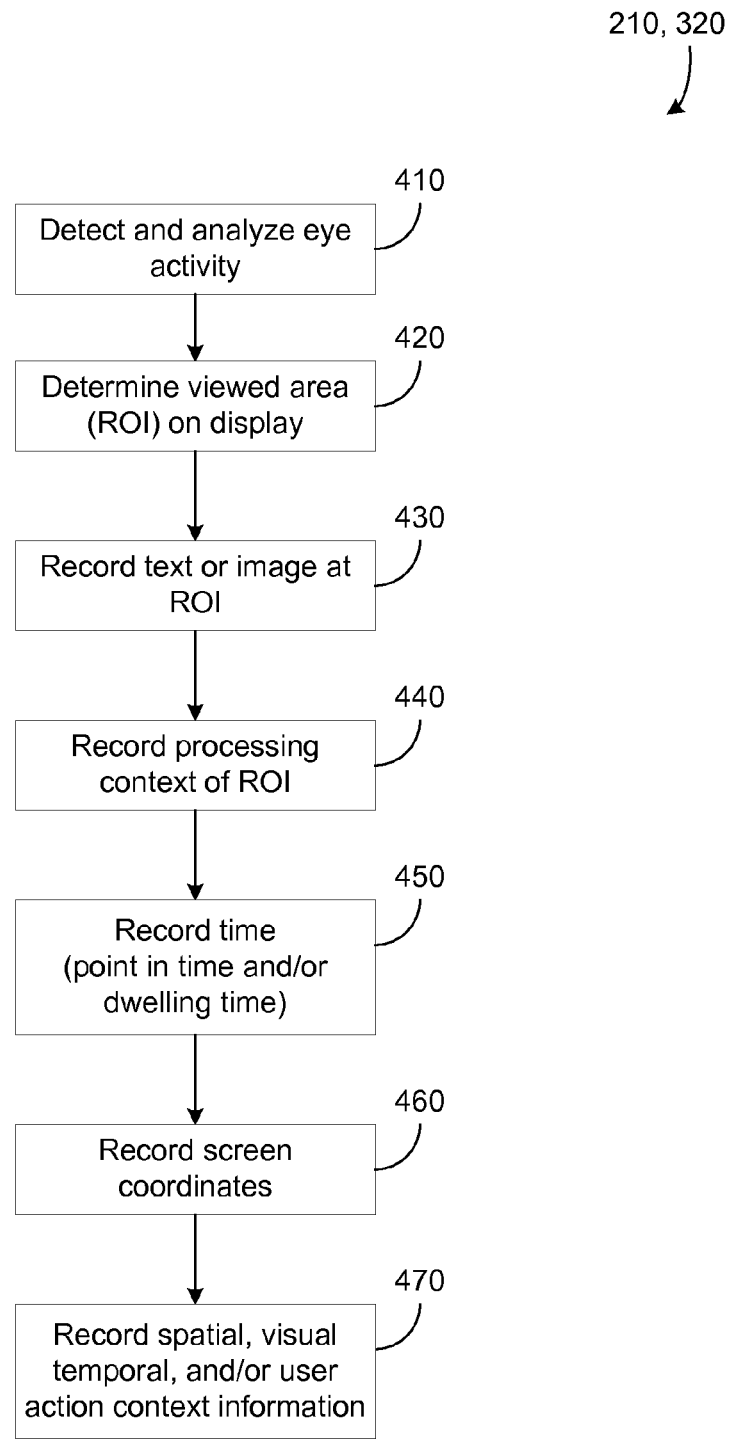
FIG. 4 is a flowchart illustrating the capture of data, according to an embodiment.

The capturing of data (210 in FIGS. 2 and 320 in FIG. 3) is illustrated in FIG. 4, according to an embodiment. At 410, the activity of the user's eyes may be detected and analyzed. Generally, the data may be captured and analyzed at three levels. First, raw gaze data may be sampled at some frequency, such as 60 Hz. Second, eye movements may be classified as either fixations or ballistic movements (known as saccades), for example. Third, clustering of fixations (or other comparable heuristic) may be used to infer intentionally observed regions, i.e., ROIs.

More specifically, the direction in which the user's eyes are pointed may be detected and the time duration of the user's fixation (i.e., dwelling time) may be determined. The direction of the user's eyes, in combination with the location and orientation of the display, may allow a determination of the observed area, or ROI, at 420. At 430, the text or image observed at the ROI may be recorded. At 440, a processing context for the ROI may be recorded. As discussed above, the processing context may include one or more of a name of a file observed in the ROI, an application displaying the file, and/or a webpage viewed in the ROI. At 450, the time at which the viewing takes place and/or the dwelling time may be recorded, where the dwelling time may have been measured at 410. At 460, the screen coordinates of the ROI may be recorded.

At 470, one or more of the spatial, visual temporal, or user action context may be recorded. As noted above, in alternative embodiments, a subset of this data related to the ROI (or none at all) may be recorded. Alternatively, additional related data may also be recorded.

In alternative embodiments, 430-470 may take place in any order. Moreover, any two or more of these may operate in parallel.

Figure 5:
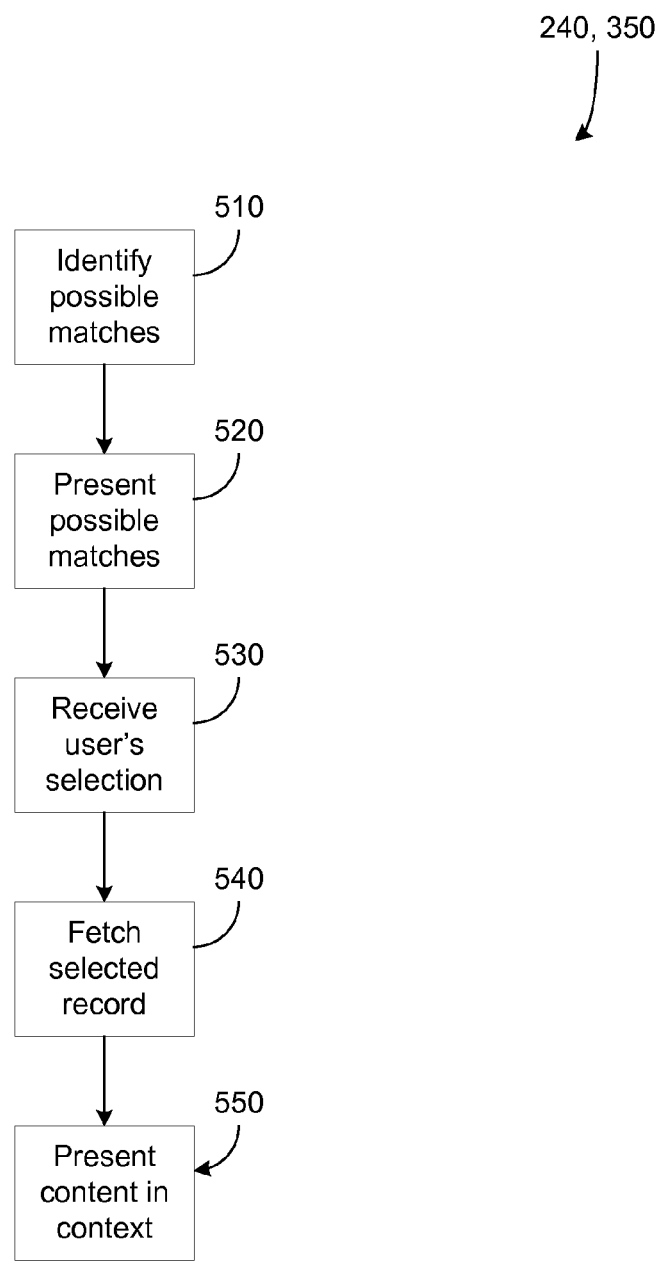
FIG. 5 is a flowchart illustrating request processing, according to an embodiment.

FIG. 5 illustrates the processing of a retrieval request (240 of FIG. 2 and 350 of FIG. 3), according to an embodiment. At 510, records in the repository are examined to identify records that may match the search criteria presented by the user. For example, if a user enters search criteria looking for ROIs in the upper right corner of the display, records may be identified having screen coordinates in that portion of the display. In an embodiment, the user may have a utility that allows the marking of the region of interest. If the user enters search criteria looking for the word "continent", records may be identified having that word in a content field. In an embodiment, records having content that approximates the search criteria may also be identified, e.g., records having content that includes words like "continual" or "continental" may be identified. Alternatively, the search criteria may specify a time or range of time at which the ROI was observed, or a location on the display at which the ROI was seen. The records will then be searched, looking for fields that contain such data. The search criteria may alternatively refer to a user action performed just before or after observing the ROI. If the ROI was observed just before opening or closing an application, the opening or closing may be used as criteria in the search; the user may look for the ROI that was seen just before opening his web browser, for example. The search would then look for records of ROIs having a field indicating that the ROI was observed just before opening of the browser.

In an embodiment, multiple criteria may be combined. A user may, for example, enter search criteria looking for an ROI having the word "continent" and having been seen yesterday at approximately 2:00 PM. Records matching or approximating these criteria may then be identified.

In an embodiment, the user may provide search criteria relating to spatial context or visual temporal context. For example, the user may recall seeing content in an ROI just to the right of a "My Computer" icon. To accommodate a search using such spatial context criteria, an ROI record may have one or more fields for data relating to spatial context. In an embodiment, the recording of any ROI and its related data may include the recording of text and/or image data that appears adjacent to the ROI. The record for the desired ROI may have, for example, one or more fields containing text or image data, where this text or image appeared adjacent to the ROI at the original time of viewing. A search over the set of records in the repository may look in these fields for an image or text relating to the "My Computer" icon. The search may then identify records of those ROIs that have the "My Computer" icon adjacent.

Alternatively, the recording of an ROI and its related data may include the creation of additional records for respective neighboring regions of the ROI. Each such record would then include spatial context fields of their own, containing links to records of adjoining regions. For example, assume that the user is looking for content that appeared next to the "My Computer" icon. In this case, the search may pursue records whose content fields include this icon. The search may therefore seek records for regions whose content fields contain the "My Computer" icon. Such records would have spatial context fields of their own, pointing to records of regions that were adjacent to this icon, including the record for the desired ROI. The spatial context links in the record for the "My Computer" icon may therefore be used to identify records for ROIs neighboring the "My Computer" icon. At least one such ROI may then be the desired ROI. In another example, the user may be looking for content that appeared next to a document (or a portion thereof) that had been opened by an application. Here, the search may pursue records whose content fields include this document or portion thereof. The search may therefore seek records for regions whose content fields contain this document. Again, such records would have spatial context fields of their own, pointing to records of regions that were adjacent to this document, including the record for the desired ROI. The spatial context links in the record for the document may therefore be used to identify records for ROIs neighboring the document.

A comparable arrangement could be used to implement searching using criteria relating to visual temporal context. For example, the user may recall seeing content in an ROI just after having looked at icon c. The user may then wish to use this temporal reference to recover the content of the ROI. To accommodate a search using such visual temporal context criteria, an ROI record may have one or more fields for data that relates to visual temporal context. The ROI record may have, for example, one or more fields containing text or image data, where the text or image had been viewed prior to or after observing the ROI. In such an embodiment, the recording of an ROI and its related data may have included the recording of text and/or image data that were viewed prior to or after observing the desired ROI. Returning to the example, a search over the set of records in the repository may look in these fields for an image or text relating to icon c. The search would therefore return records for ROIs that had been observed just before or after having viewed icon c. Moreover, the visual temporal context may be defined as not just a single event (e.g., having looked at icon c), but as a sequence of events that preceded or followed observing the ROI, or as a sequence of events which included observing the ROI. Here, the ROI record may have, for example, one or more fields containing text or image data, where the text or image had been viewed during such a sequence. A search over records containing such fields may then lead to the desired ROI.

Alternatively, the recording of an ROI and its related data may include the creation of additional records for the respective ROIs observed just prior to and just after observing the desired ROI. Any record for an ROI would then include temporal visual context fields containing links to the records of those respective ROIs observed right before or afterwards. In this case, if the user were to search for content that was viewed right after having viewed icon c, records whose content fields include this icon may be examined. The visual temporal context links in these records may be used to identify records for ROIs that were observed right after having viewed icon c.

Returning to FIG. 5, at 520, one or more possible matches may be presented to the user. Exact matches may be returned; in an alternative embodiment, approximate matches may also be returned. At 530, the user's choice from among the presented matches is received. At 540, the selected record is fetched, and at 550, the corresponding content is presented to the user. In an embodiment, this content may be presented to the user in its original processing context, e.g., presenting the original file using the application in which it was originally viewed.

Figure 6:
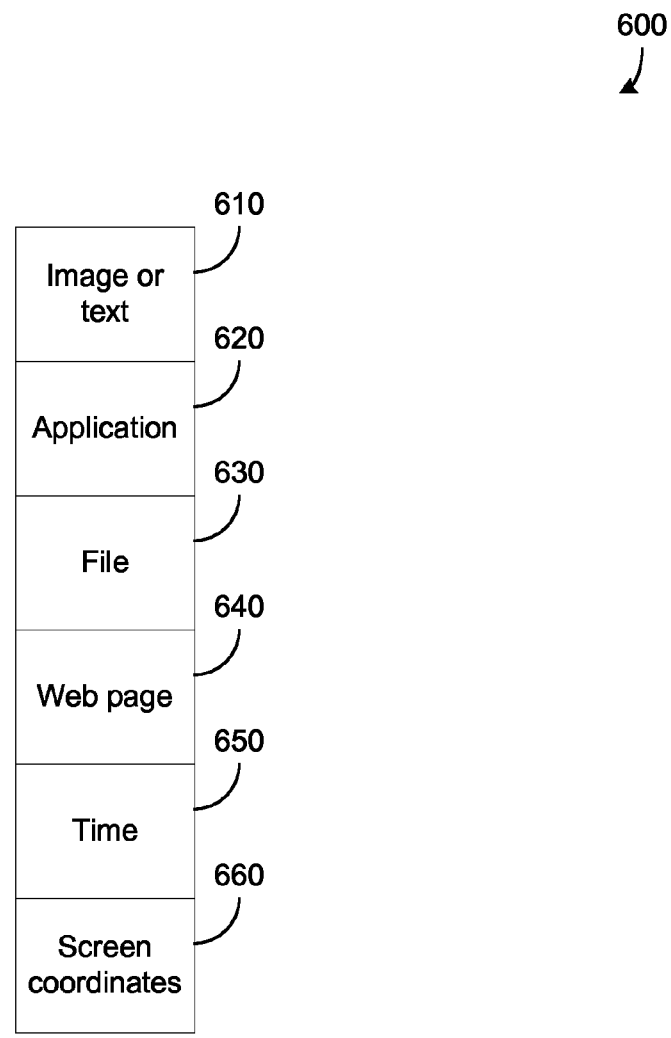
FIG. 6 illustrates a record associated with a region of interest, according to an embodiment.

FIG. 6 illustrates a record 600 for an ROI, in an embodiment. There are six fields illustrated, but it is to be understood that in alternative embodiments more fields or fewer fields may be employed. Field 610 contains the content observed in the ROI; this content may be image, textual, or other form data observed in the ROI. Field 620 identifies the application that was employed to display the image or text of field 610. In an embodiment, field 620 may also include a location in the application (e.g., a selected option in the application). Field 630 may identify the file that had been opened by the application of field 620 and that contained the image or text observed in the ROI. If the application of field 620 is a web browser, field 640 may identify the webpage viewed in the ROI. Field 650 may identify the time at which the ROI was observed and/or the duration or dwelling time of this viewing. In an alternative embodiment, there may be separate fields for each. Field 660 may identify the screen coordinates of the location of the ROI. In an embodiment, a record such as record 600 may be used in situations where the recording of ROIs and related data takes place at the user's explicitly direction, as illustrated in FIG. 3.

Figure 7:
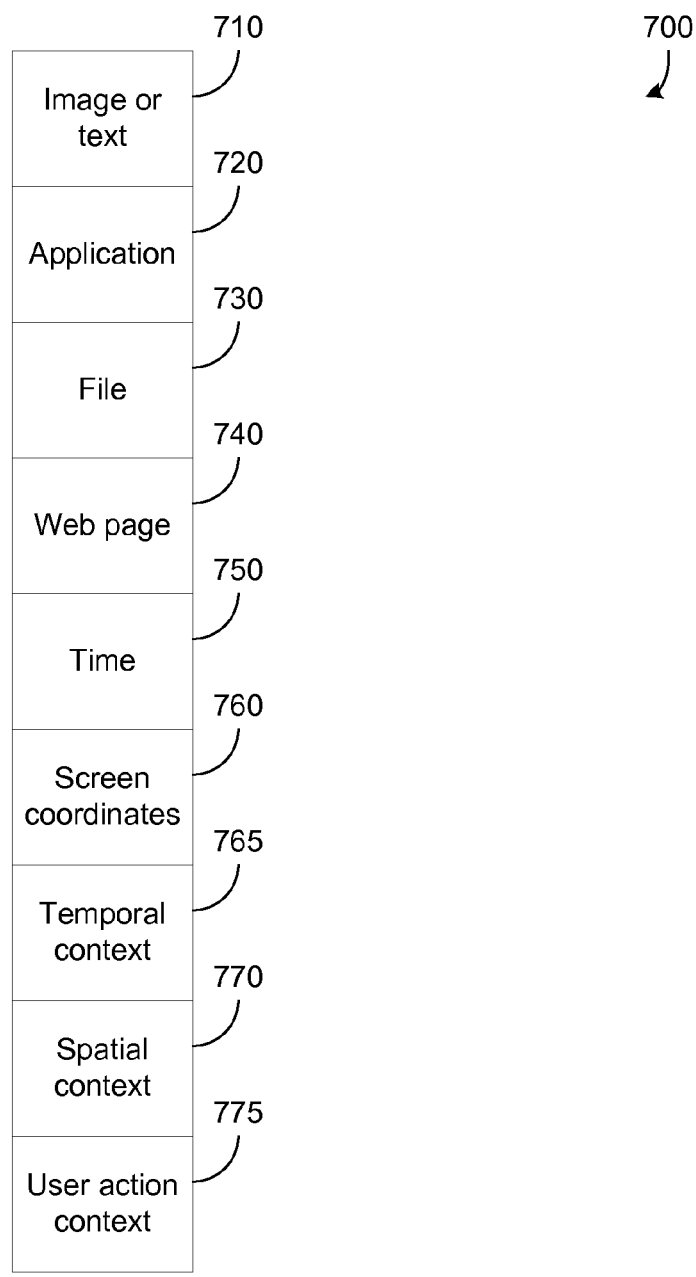
FIG. 7 illustrates a record associated with a region of interest, according to an alternative embodiment.

FIG. 7 illustrates a record for an ROI in an alternative embodiment. There are eleven fields illustrated in this particular embodiment. Field 710 may contain the content observed in the ROI, such as image data or textual data. Field 720 may identify the application that was employed to display the image or text of field 710. In an embodiment, field 720 may also include a location in the application (e.g., a selected option in the application). Field 730 may identify the file that had been opened by the application of field 720 and that contained the image or text observed in the ROI. If the application of field 720 is a web browser, field 740 may identify the webpage viewed in the ROI. Field 750 may identify the time at which the ROI was observed and/or the duration or dwelling time of this viewing. In an alternative embodiment, there may be separate fields for each. Field 760 may identify the screen coordinates of the location of the ROI.

Field 765 may store information relating to the temporal context of the ROI. Given that a user may typically focus on different regions of a display from moment to moment, this field may store information relating to regions viewed prior to and/or after observing of the ROI of record 700. For example, temporal context field 765 may store image data or text data representing what was viewed by the user prior to or after viewing the content of field 710, as discussed above. Alternatively, field 765 may store one or more links to other records, where these other records corresponds to ROIs observed by the user prior to or after viewing the content of field 710. Field 765 allows the user to search for record 700 by specifying, as search criteria, what was viewed prior to or after observing the desired ROI.

Field 770 may store information relating to the spatial context of the ROI. Because an ROI will typically have neighboring regions on the display, this field may store information relating to such neighboring regions. For example, spatial context field 770 may store image data or text data that occurred in one or more regions adjoining the ROI. Alternatively, field 770 may store one or more links to other records, where these records correspond to ROIs of such adjoining regions. Field 770 allows the user to search for record 700 by specifying, as search criteria, what was present on screen in regions neighboring to the desired ROI.

Field 775 may store information relating to the user action context of the ROI. The user may typically perform a variety of actions in the course of using a computer. The user may, for example, start or close applications, open or close windows, send e-mails, click a button, scroll, etc. Field 775 may store data that specifies actions taken prior to and/or after the observing of the ROI. Such data may describe the opening of a file a, or the closing of a window Z, or the opening of an application X, for example. Field 775 allows the user to search for record 700 by specifying, as search criteria, what was performed by the user prior to or after observing the desired ROI.

Note that, in various embodiments, fields 765 through 775 may actually represent one or more fields or subfields, where each field or subfield stores a component of the particular context. In the case of field 765, for example, one subfield may store data representing what was viewed prior to observing the ROI, while another subfield may store data representing what was viewed after observing the ROI. In the case of field 770, one subfield may store data representing text or image data that appeared below the ROI, while another subfield may store data representing text or image data that appeared above the ROI, etc. In the case of field 775, one subfield may store data that specifies one or more actions taken prior to the observing of the ROI, while another subfield may store data specifying one or more actions taken after observing the ROI. Moreover, multiple subfields may be used, where each stores data specifying an action taken before or after observing the ROI.

In an embodiment, a record such as record 700 may be used in situations where the recording of ROIs and related data takes place continually, as illustrated in FIG. 2.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The term software, as used herein, may refer to a computer program product including a computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, random access memory, read-only memory, or other data storage device.

Figure 8:
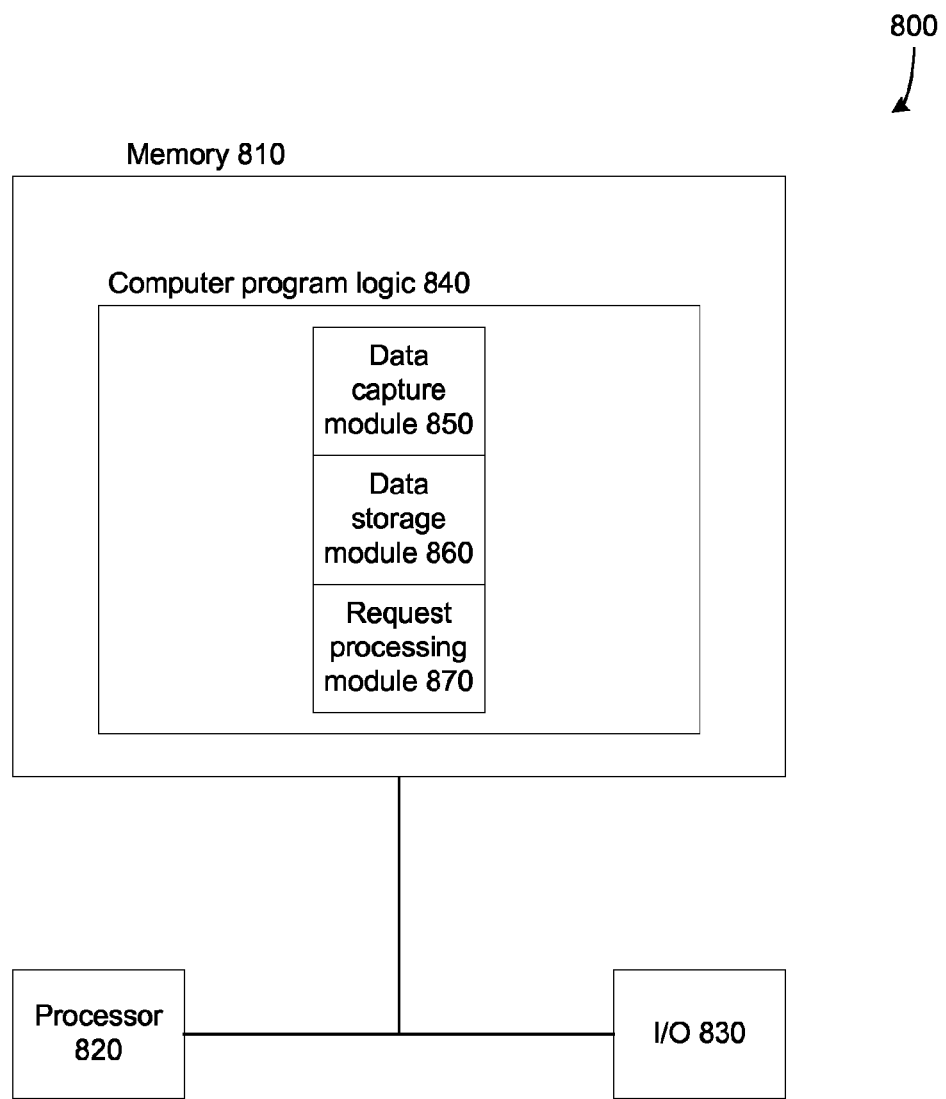
FIG. 8 illustrates a computing system in which the system described herein may be implemented, according to an embodiment.

A computing system that executes such software/firmware is shown in FIG. 8, according to an embodiment. The illustrated system 800 may include one or more processor(s) 820 and may further include a body of memory 810. Processor(s) 820 may include one or more central processing unit cores and/or a graphics processing unit having one or more GPU cores. Memory 810 may include one or more computer readable media that may store computer program logic 840. Memory 810 may be implemented as a hard disk and drive, a removable media such as a compact disk, a read-only memory (ROM) or random access memory (RAM) device, for example, or some combination thereof. Processor(s) 820 and memory 810 may be in communication using any of several technologies known to one of ordinary skill in the art, such as a bus or point-to-point interconnect. Computer program logic 840 contained in memory 810 may be read and executed by processor(s) 820. One or more I/O ports and/or I/O devices, shown collectively as I/O 830, may also be connected to processor(s) 820 and memory 810. In an embodiment, I/O 830 may include a display 120 and a camera apparatus 150, as shown as in FIG. 1.

Computer program logic 840 may include logic that embodies the processing described above. In the illustrated embodiment, computer program logic 840 may include a data capture module 850 that embodies the logic described above with respect to FIG. 4. Computer program logic 840 may also include a data storage module 860 that embodies the logic described above (430-470 of FIG. 4, in an embodiment) and stores data according to the formats of FIGS. 6 and 7. Computer program logic 840 may also include a request processing module 870 that embodies the logic described above with respect to FIG. 5. Computer program logic 840 may also include one or more processing modules that perform or facilitate the determination of the display location viewed by a user. Alternatively, such a determination may be performed using hardware or some combination of hardware and software.

Figure 9:
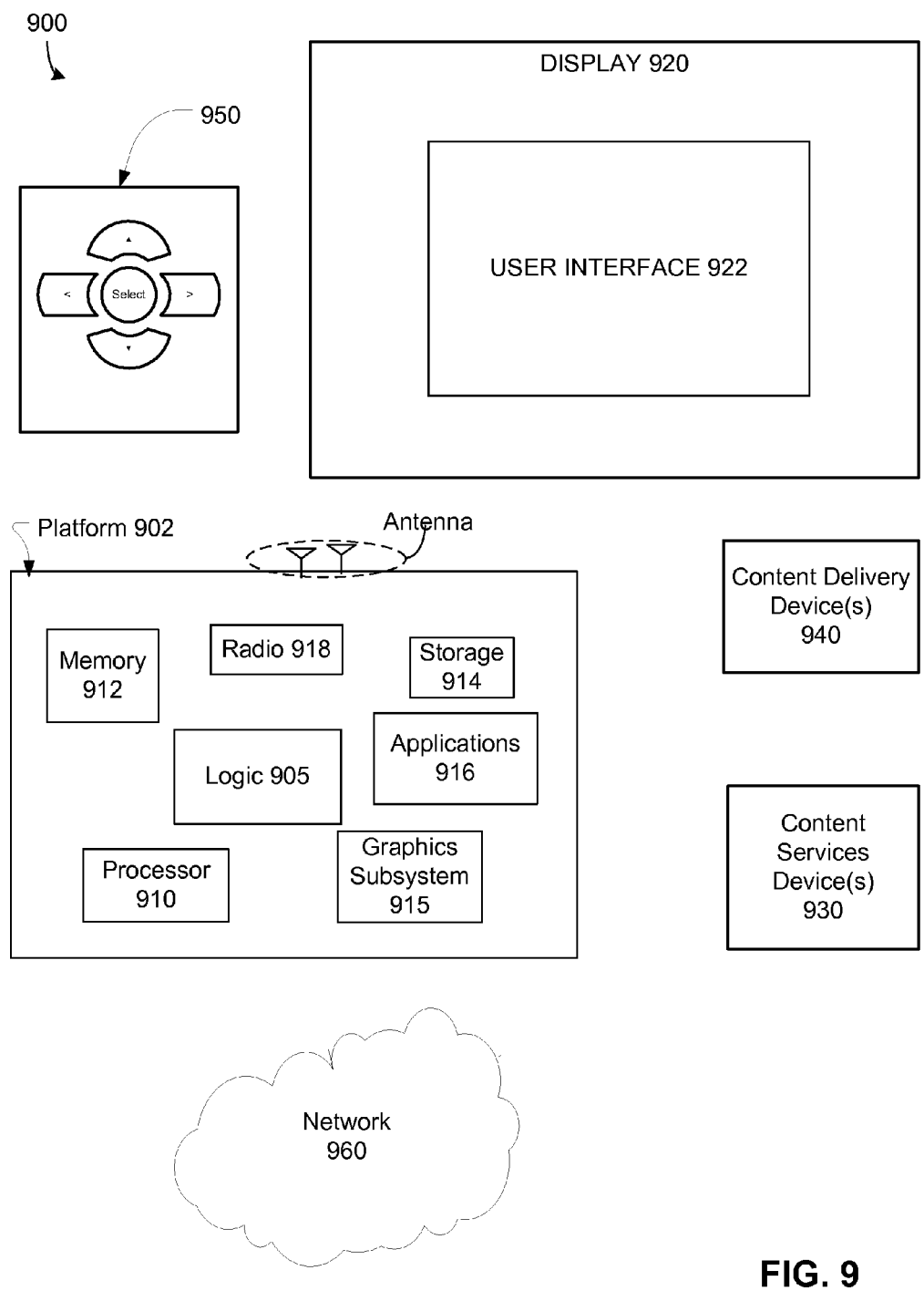
FIG. 9 illustrates a platform in which the system described herein may operate, according to an embodiment.

The system described herein may be a part of a multifunctional information system. FIG. 9 illustrates an embodiment of the latter. In embodiments, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), e-reader, cellular telephone, combination cellular telephone/PDA, television, smart device (e.g., smart phone, smart tablet or smart television), mobile internet device (MID), messaging device, data communication device, and so forth.

In embodiments, system 900 comprises a platform 902 coupled to a display 920. Platform 902 may receive content from a content device such as content services device(s) 930 or content delivery device(s) 940 or other similar content sources. A navigation controller 950 comprising one or more navigation features may be used to interact with, for example, platform 902 and/or display 920. Each of these components is described in more detail below.

In embodiments, platform 902 may comprise any combination of a logic 905, processor 910, memory 912, storage 914, graphics subsystem 915, applications 916 and/or radio 918. Logic 905 may include I/O control logic and/or memory control logic, and may provide intercommunication among processor 910, memory 912, storage 914, graphics subsystem 915, applications 916 and/or radio 918. For example, logic 905 may include a storage adapter (not depicted) capable of providing intercommunication with storage 914. In alternative embodiments, I/O control logic and memory control logic of logic 905 may be implemented in separate components, and may or may not be implemented in processor 910.

Processor 910 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 910 may comprise dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 914 may comprise technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, DisplayPort, wireless HDMI, and/or wireless HD compliant techniques. Graphics subsystem 915 could be integrated into processor 910 or chipset 905. Graphics subsystem 915 could be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 918 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In embodiments, display 920 may comprise any monitor or display, and may correspond to display 120 of FIG. 1. Display 920 may comprise, for example, a computer display screen, touch screen display, video monitor, television-like device, and/or a television. Display 920 may be digital and/or analog. In embodiments, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In embodiments, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In embodiments, content services device(s) 930 may comprise a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 receives content such as cable television programming including media information, digital information, and/or other content. Examples of content providers may include any cable or satellite television or radio or Internet content providers. The provided examples are not meant to limit embodiments of the invention.

In embodiments, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be echoed on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but integrated into platform 902 and/or display 920. Embodiments, however, are not limited to the elements or in the context shown or described herein.

In embodiments, drivers (not shown) may comprise technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 when the platform is turned "off." In addition, chip set 905 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the invention.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
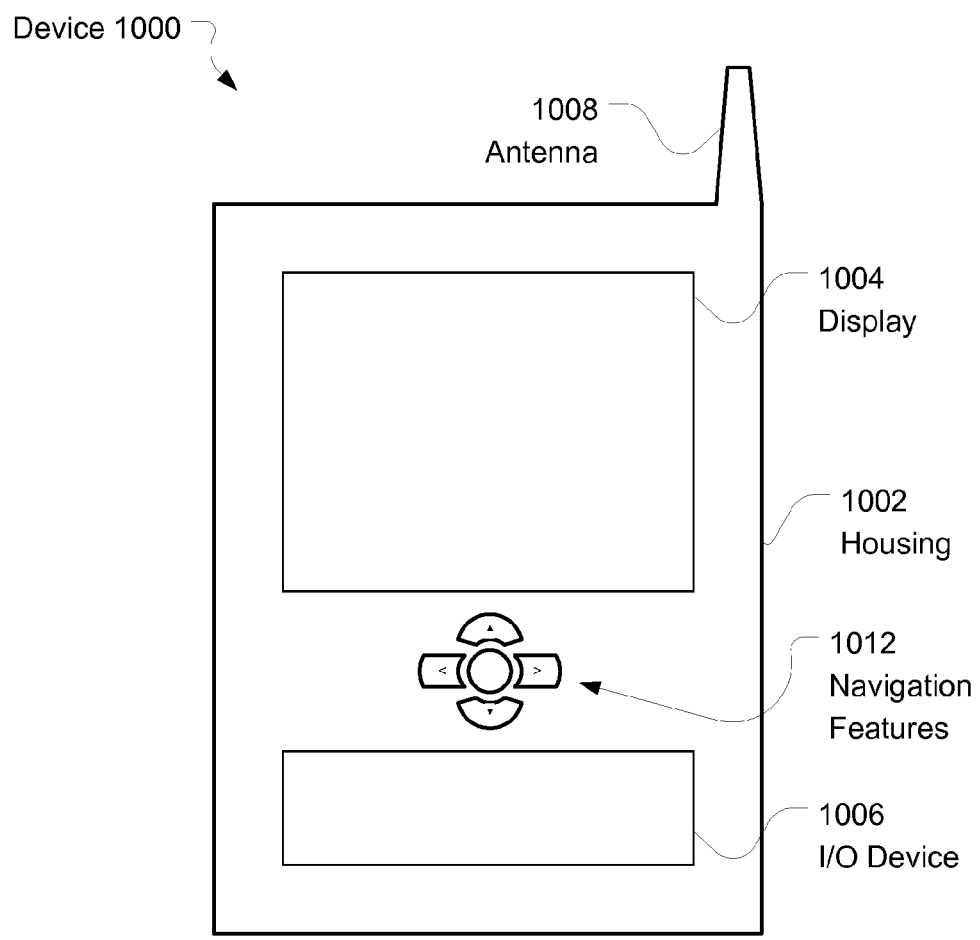
FIG. 10 illustrates a mobile information device in which the system described herein may be implemented, according to an embodiment.

As described above, system 900 may be embodied in varying physical styles or form factors. FIG. 10 illustrates embodiments of a small form factor device 1000 in which system 900 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), e-reader, cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may comprise a housing 1002, a display 1004, an input/output (I/O) device 1006, and an antenna 1008. Device 1000 also may comprise navigation features 1012. Display 1004 may comprise any suitable display unit for displaying information appropriate for a mobile computing device. I/O device 1006 may comprise any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone. Such information may be digitized by a voice recognition device. The embodiments are not limited in this context.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including at least one computer readable medium having computer program logic stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, or other data storage device.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

//* C. 1-12: *//

In an embodiment, a method implementing the above processing may comprise determining a region of interest (ROI) observed by a user on a display, recording content observed in the region, recording a processing context of the content, storing the recorded information in a repository, and making the recorded information accessible to the user upon request at a later time.

The content may comprise one or more of text information and image information. The processing context may comprise one or more of an application observed in the region, a location in the application, a file open in the region, a location in the file where the location in the file is in the region, a web page observed in the region, and a location in the web page, where the location in the web page is in the region.

The method may further comprise recording the time at which the region of interest is observed, performed before said storing. The method may also comprise recording screen coordinates of the region of interest observed, performed before said storing.

The storing may comprise creating a record and storing the recorded information in the record. This may include storing, in the record, links to one or more related records. The one or more related records may comprise at least one of a record for a previously observed region of interest, a record for a subsequently observed region of interest, and a record for a region adjacent to the observed region of interest. The storing may also comprise storing, in the record, one or more of an identification of a user action taken prior to the observation, and identification of a user action taken after the observation. The storing may also include storing, in the record, the time duration through which the user visually dwelled on the region.

Making the information accessible may comprise receiving search criteria from the user, searching the repository for recorded information that matches for the search criteria, returning to the user one or more references to any recorded information that matches the search criteria, receiving from the user a selection of one or more of the references, and presenting to the user content corresponding to the selection in a recreated context associated with the corresponding content. The search criteria may comprise one or more of a description of the content in the region of interest, a reference to the time or range of time at which the region of interest was observed, a reference to the location or area on the display at which the region of interest was observed, a reference to a user action taken prior to the observation, a reference to a user action taken after the observation, a reference to a previously observed region of interest, a reference to a subsequently observed region of interest, and a reference to a region adjacent to the observed region of interest.

An embodiment may be implemented by a computer program product comprising a non-transitory computer useable medium having control logic stored therein, the computer control logic comprising logic to cause a processor to perform the processing described above.

In an embodiment, the processing described above may be performed by a system comprising a processor and a memory in communication with said processor, said memory for storing a plurality of processing instructions configured to direct said processor to determine a region of interest (ROI) observed by a user on a display, record content observed in the region, record a processing context of the content, store the recorded information in a repository, and make the recorded information accessible to the user upon request at a later time.

The content may comprise one or more of text information and image information. The processing context may comprise one or more of an application observed in the region, a location in the application, a file open in the region, a location in the file where the location in the file is in the region, a web page observed in the region, and a location in the web page, where the location in the web page is in the region.

The plurality of processing instructions may be further configured to direct said processor to record the time at which the region of interest is observed, where this may be performed before said storing. The plurality of processing instructions may be further configured to direct said processor to record screen coordinates of the region of interest observed, where this may be performed before said storing.

The storing may comprise creating a record and storing the recorded information in the record. The plurality of processing instructions may be further configured to direct said processor to store, in the record, links to one or more related records. The one or more related records may comprise at least one of a record for a previously observed region of interest, a record for a subsequently observed region of interest, and a record for a region adjacent to the observed region of interest. The plurality of processing instructions configured to direct said processor to store, in the record, the recorded information, may comprise a plurality of processing instructions configured to direct said processor to store one or more of identification of a user action taken prior to the observation, and identification of a user action taken after the observation. The plurality of processing instructions configured to direct said processor to store, in the record, the recorded information, may comprise a plurality of processing instructions configured to direct said processor to store the time duration through which the user visually dwelled on the region.

The plurality of processing instructions configured to direct said processor to make the information accessible may comprise a plurality of processing instructions configured to direct said processor to receive search criteria from the user, search the repository for recorded information that matches for the search criteria, return to the user one or more references to any recorded information that matches the search criteria, receive from the user a selection of one or more of the references, and present to the user content corresponding to the selection in a recreated context associated with the corresponding content. The search criteria may comprise one or more of a description of the content in the region of interest, a reference to the time or range of time at which the region of interest was observed, a reference to the location or area on the display at which the region of interest was observed, a reference to a user action taken prior to the observation, a reference to a user action taken after the observation, a reference to a previously observed region of interest, a reference to a subsequently observed region of interest, and a reference to a region adjacent to the observed region of interest.

The system may further comprise a non-volatile memory configured to store said repository. The system may further comprise a connection to a network that is configured to provide remote access to a non-volatile memory configured to store said repository.

The systems, methods, and computer program products have an advantage of allowing the capture or recall of content that had been previously viewed by a user on a display of an information appliance. An additional advantage is that the user is not necessarily required to take an explicit action to do so.

What is claimed is:

1. A method, comprising:
    identifying a portion of content, for each of multiple instances of content presented at a display, based on based on eye fixations and saccadic eye movements of a user;
    recording the portions of content in a data repository;
    populating records of the portions of content with contextual information related to the respective portions of content;
    searching one or more data fields of the records to identify content of interest to the user amongst the recorded portions of content, based a user-specified one or more of,
        an application program that caused the content of interest to the user to be presented at the display,
        a file type of the content of interest to the user,
        a uniform resource locator (URL) associated with the content of interest to the user,
        a time at which content of interest to the user had been presented at the display,
        a position of the display at which the content of interest to the user had been presented at the display,
        information related to content presented at the display prior to, concurrently with, and/or subsequent to presentation of the content of interest to the user, and
        an indication of an action performed by the user prior to and/or subsequent to a time at which the content of interest to the user had been presented at the display; and
    presenting one or more of the portions of content for which the respective data record satisfies the user query, at the display.

2. The method of claim 1, wherein:
    the populating includes populating an application program field of a record with an indication of an application program that caused the respective portion of content to be present at the display; and
    the searching includes searching the application program field of the record based on the user-specified application program that caused the content of interest to the user to be presented at the display.

3. The method of claim 1, wherein
    the populating includes populating a file type field of a record with a file type of the respective portion of content; and
    the searching includes searching the file type field of the record based on the user-specified file type of the content of interest to the user.

4. The method of claim 1, wherein:
    the populating includes populating a URL field of a record with a URL of the respective portion of content; and
    the searching includes searching the URL field of the record based on the user-specified URL associated with the content of interest to the user.

5. The method of claim 1, wherein:
    the populating includes populating a time field of a record with a time at which the respective portion of content had been presented at the display; and
    the searching includes searching the time field of the record based on the user-specified time at which the content of interest to the user had been presented at the display.

6. The method of claim 1, wherein:
the populating includes populating a position field of a record with a position of the display at which the respective portion of content had been presented; and
the searching includes searching the position field of the record based on the user-specified position at which the content of interest to the user had been presented at the display.

7. The method of claim 1, wherein:
the populating includes populating a temporal context field of a record with information related to content presented at the display prior to and/or subsequent to presentation of the respective portion of content; and
the searching includes searching the temporal context field of the record based on the user-specified information related to content presented at the display prior to and/or subsequent to presentation of the content of interest to the user.

8. The method of claim 1, wherein:
the populating includes populating a spatial context field of a record with information related to content presented at the display concurrently with presentation of the respective portion of content; and
the searching includes searching the spatial context field of the record based on the user-specified information related to content presented at the display concurrently with presentation of the content of interest to the user.

9. The method of claim 1, wherein:
the populating includes populating a user action field of a record with an indication of an action performed by the user prior to and/or subsequent to a time at which the respective portion of content had been presented at the display; and
the searching includes searching the user action field of the record based on the user-specified indication of an action performed by the user prior to and/or subsequent to a time at which the content of interest to the user had been presented at the display.

10. The method of claim 1, further including:
performing the searching and the presenting while performing the identifying, the recording, and the populating.

11. A system, comprising, a processor and memory configured to:
identify a portion of content, for each of multiple instances of content presented at a display, based on based on eye fixations and saccadic eye movements of a user;
record the portions of content in a data repository;
populate records of the portions of content with contextual information related to the respective portions of content;
search one or more data fields of the records to identify content of interest to the user amongst the recorded portions of content, based a user-specified one or more of,
an application program that caused the content of interest to the user to be presented at the display,
a file type of the content of interest to the user,
a uniform resource locator (URL) associated with the content of interest to the user,
a time at which content of interest to the user had been presented at the display,
a position of the display at which the content of interest to the user had been presented at the display,
information related to content presented at the display prior to, concurrently with, and/or subsequent to presentation of the content of interest to the user, and
an indication of an action performed by the user prior to and/or subsequent to a time at which the content of interest to the user had been presented at the display; and
present one or more of the portions of content for which the respective data record satisfies the user query, at the display.

12. The system of claim 11, wherein the processor and memory are further configured to:
populate an application program field of a record with an indication of an application program that caused the respective portion of content to be presented at the display; and
search the application program field of the record based on the user-specified application program that caused the content of interest to the user to be presented at the display.

13. The system of claim 11, wherein the processor and memory are further configured:
populate a file type field of a record with a file type of the respective portion of content; and
search the file type field of the record based on the user-specified file type of the content of interest to the user.

14. The system of claim 11, wherein the processor and memory are further configured to:
populate a URL field of a record with a URL of the respective portion of content; and
search the URL field of the record based on the user-specified URL associated with the content of interest to the user.

15. The system of claim 11, wherein the processor and memory are further configured to:
populate a time field of a record with a time at which the respective portion of content had been presented at the display; and
search the time field of the record based on the user-specified time at which the content of interest to the user had been presented at the display.

16. The system of claim 11, wherein processor and memory are further configured to:
populate a position field of a record with a position of the display at which the respective portion of content had been presented; and
search the position field of the record based on the user-specified position at which the content of interest to the user had been presented at the display.

17. The system of claim 11, wherein the processor and memory are further configured to:
populate a temporal context field of a record with information related to content presented at the display prior to and/or subsequent to presentation of the respective portion of content; and
search the temporal context field of the record based on the user-specified information related to content presented at the display prior to and/or subsequent to presentation of the content of interest to the user.

18. The system of claim 11, wherein the processor and memory are further configured to:
populate a spatial context field of a record with information related to content presented at the display concurrently with presentation of the respective portion of content; and search the spatial context field of the record based on the user-specified information related to content presented at the display concurrently with presentation of the content of interest to the user.

19. The system of claim 11, wherein the processor and memory are further configured to:
populate a user action field of a record with an indication of an action performed by the user prior to and/or subsequent to a time at which the respective portion of content had been presented at the display; and
search the user action field of the record based on the user-specified indication of an action performed by the user prior to and/or subsequent to a time at which the content of interest to the user had been presented at the display.

20. The system of claim 11, wherein the processor and memory are further configured to:
search the one or more fields of the records and present the one or more portion of content, while identifying, recording, and populating a record with respect to a portion of content presented at the display.

21. A non-transitory computer readable medium encoded with a computer program that includes instructions to cause a processor to:
identify a portion of content, for each of multiple instances of content presented at a display, based on based on eye fixations and saccadic eye movements of a user;
record the portions of content in a data repository;
populate records of the portions of content with contextual information related to the respective portions of content;
search one or more data fields of the records to identify content of interest to the user amongst the recorded portions of content, based a user-specified one or more of,
an application program that caused the content of interest to the user to be presented at the display,
a file type of the content of interest to the user,
a uniform resource locator (URL) associated with the content of interest to the user,
a time at which content of interest to the user had been presented at the display,
a position of the display at which the content of interest to the user had been presented at the display,
information related to content presented at the display prior to, concurrently with, and/or subsequent to presentation of the content of interest to the user, and
an indication of an action performed by the user prior to and/or subsequent to a time at which the content of interest to the user had been resented at the display; and
present one or more of the portions of content for which the respective data record satisfies the user query, at the display.

22. The non-transitory computer readable medium of claim 21, further including instructions to cause the processor to:
populate an application program field of a record with an indication of an application program that caused the respective portion of content to be presented at the display; and
search the application program field of the record based on the user-specified application program that caused the content of interest to the user to be presented at the display.

23. The non-transitory computer readable medium of claim 21, further including instructions to cause the processor to:
populate a file type field of a record with a file type of the respective portion of content; and
search the file type field of the record based on the user-specified file type of the content of interest to the user.

24. The non-transitory computer readable medium of claim 21, including instructions further including instructions to cause the processor to:
populate a URL field of a record with a URL of the respective portion of content; and
search the URL field of the record based on the user-specified URL associated with the content of interest to the user.

25. The non-transitory computer readable medium of claim 21, further including instructions to cause the processor to:
populate a time field of a record with a time at which the respective portion of content had been presented at the display; and
search the time field of the record based on the user-specified time at which the content of interest to the user had been presented at the display.

26. The non-transitory computer readable medium of claim 21, further including instructions to cause the processor to:
populate a position field of a record with a position of the display at which the respective portion of content had been presented; and
search the position field of the record based on the user-specified position at which the content of interest to the user had been presented at the display.

27. The non-transitory computer readable medium of claim 21, further including instructions to cause the processor to:
populate a temporal context field of a record with information related to content presented at the display prior to and/or subsequent to presentation of the respective portion of content; and
search the temporal context field of the record based on the user-specified information related to content presented at the display prior to and/or subsequent to presentation of the content of interest to the user.

28. The non-transitory computer readable medium of claim 21, further including instructions to cause the processor to:
populate a spatial context field of a record with information related to content presented at the display concurrently with presentation of the respective portion of content; and
search the spatial context field of the record based on the user-specified information related to content presented at the display concurrently with presentation of the content of interest to the user.

29. The non-transitory computer readable medium of claim 21, further including instructions to cause the processor to:
populate a user action field of a record with an indication of an action performed by the user prior to and/or subsequent to a time at which the respective portion of content had been presented at the display; and
search the user action field of the record based on the user-specified indication of an action performed by the user prior to and/or subsequent to a time at which the content of interest to the user had been presented at the display.

30. The non-transitory computer readable medium of claim 21, further including instructions to cause the processor to:

search the one or more fields of the records and present the one or more portion of content, while identifying, recording, and populating a record with respect to a portion of content presented at the display.

* * * * *